H. J. BRENNECKE.
GOGGLE HINGE.
APPLICATION FILED JULY 27, 1914.
1,230,555.
Patented June 19, 1917.
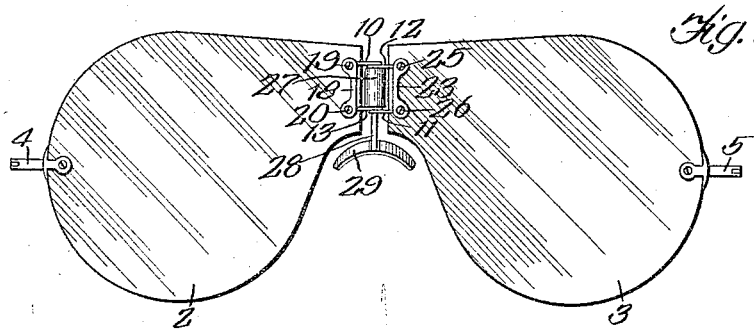
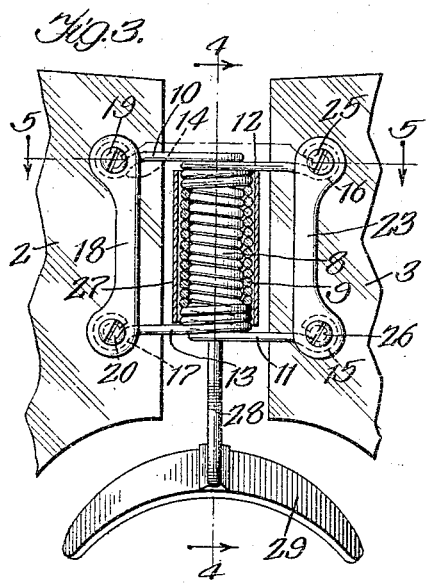
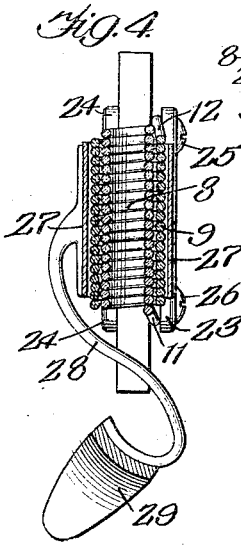
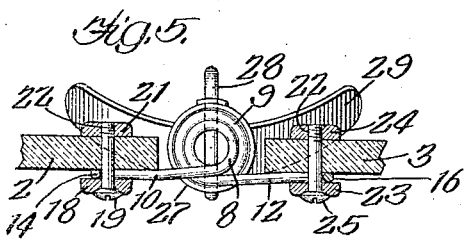
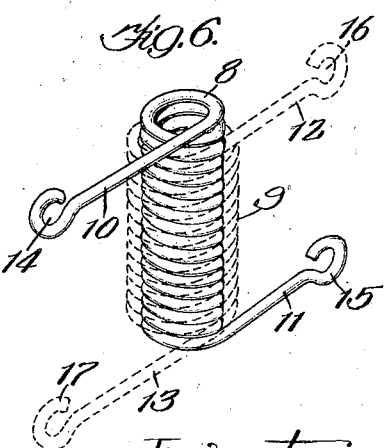
Witnesses:
Inventor:
Herman J. Brennecke

UNITED STATES PATENT OFFICE.

HERMAN J. BRENNECKE, OF CHICAGO, ILLINOIS.

GOGGLE-HINGE.

1,230,555.   Specification of Letters Patent.   Patented June 19, 1917.

Application filed July 27, 1914. Serial No. 853,308.

*To all whom it may concern:*

Be it known that I, HERMAN J. BRENNECKE, a citizen of the United States, residing at Chicago, in the county of Cook and State of Illinois, have invented certain new and useful Improvements in Goggle-Hinges, of which the following is a specification.

My invention relates to goggles and the like and has particular reference to the connection of the lenses. The object of the invention is to provide a flexible hinge connection which shall combine the advantages of the pivotal connection permitting free movement of the lenses toward each other with the advantages of sufficient rigidity to normally hold the lenses in their normal relation to each other as in the case of comparatively rigid connections.

Another object of the invention is to provide a combined action hinge as stated of a commercially practicable construction, convenient and comparatively inexpensive to make and pleasing in appearance. A still further object is to provide self adjustability of the nose-piece in connection with the hinge.

With these objects in view and such other advantages as the construction herein described discloses, the invention consists in the novel construction, combination and arrangement of parts, all as hereinafter described in detail, illustrated in the accompanying drawing and incorporated in the appended claim.

In the drawing—

Figure 1 is a side view of a full size pair of goggles to which my invention has been applied.

Fig. 2 is a perspective view showing the lenses folded upon each other into compact form adapted for a small case.

Fig. 3 is an enlarged elevation of the parts of my invention with sections of the lenses thereon.

Fig. 4 is a section taken substantially on the line 4—4 of Fig. 3.

Fig. 5 is a section taken substantially on the line 5—5 of Fig. 3.

Fig. 6 is a perspective view of the coiled spring portions of the hinge.

In the several views 2 and 3 represents the lenses equipped with the usual bow-fittings 4 and 5 which support the bows 6 and 7. The combined pivotal and relatively rigid hinge consists of a coiled spring 8 which serves as the pintle or pivot for a similar coiled spring 9. The spring 8 has horizontally extending ends 10 and 11 projecting in opposite directions at the respective ends of the spring. These ends I term "leaves" on account of their resemblance to the leaves of a hinge. The end or arm 10 is secured to one of the lenses, as the lens 2, while the end or arm 11 is secured to the opposite lens, such as the lens 3. The spring 9 has similar arms 12 and 13 which are oppositely engaged with the lenses, that is, the upper arm 12 engages the lens 3 while the lower arm 13 engages the lens 2. On the ends of the arms are eyes 14 and 15 and 16 and 17. The eyes are formed by bending the wire of which the spring is made. The eyes 14 and 17 are clamped between the lens 2 and a cross-bar 18 having at its ends screw holes for screws 19 and 20 which pass through the bar and said eyes 14 and 17. On the opposite side of the lens a bar 21, similar to the bar 18, is provided with threaded bores 22 with which said screws have threaded engagement. These bars may be increased in number, by, for instance, interposing one between the eyes and the lens. Similarly the eyes 15 and 16 are clamped onto the lens 3 by means of similar bars 23 and 24 and screws 25 and 26.

On the outer spring coil 9 is revolubly mounted a sleeve or cylinder 27 which is confined between the arms 12 and 13. To this sleeve or cylinder is secured an S-curved arm 28 which carries a nose-piece 29 which, owing to the revolubility of the sleeve, is unaffected by the usual angular movement of the lenses when in place over a user's eyes, which makes the nose-piece sit more comfortably. The spring coil hinge permits the utmost freedom of angular movement of the lenses relative to each other without straining the hinge or endangering its integrity. The eyes 14 to 17 being on flexible arms are adjustable to the slight inequalities in distances between the screw holes that may take place in boring the screw holes of a number of lenses. The flexibility of this hinge lends itself not only to the usual or plain angular movement of the lenses but to a moderate twisting vertically, or so that the adjacent, or hinge, edges of the lenses can move angularly relative to each other. The hinge is, in effect, one with a flexible pivot having integral hinge-leaves, or a hinge having the equivalent of the two leaves, but each leaf having a pivot member, or two hinge pivots with leaves attached. The hinge, including leaves and pivots or pivot, thus consists of but two parts and the pivots and leaves so arranged that the nose-piece support is mounted on the hinge-pivot and uses this pivot as its axis of movement.

In their relations to each other the coil 9 is substantially a hinge knuckle and the coil 8 a hinge pintle, each carrying a hinge leaf, or pair of leaves when the arms extend in opposite directions as shown. With the arm 11 occupying the dotted line position of the arm 13, and the latter occupying the position of the arm 11 in Fig. 6, the arms 10 and 11 may be regarded as a single leaf; likewise the arms 12 and 13. The hinge would then be a two-part hinge without the support against accidental relative angular movement of the lenses, but the features of simplicity of construction and adjustability of the eyes 14 and 17 and 16 and 15 toward or from each other on the same lens would be retained.

Having thus described my invention, I claim as new and desire to secure by Letters Patent—

The combination with a pair of lenses of an angularly movable, two-part connection therefor which consists of a pair of wire coils, one revolubly mounted upon the other, each of said coils terminating in a pair of arms, one arm of said pair extending to one lens and the other arm extending to the other lens, and means for securing said arms to the lenses.

In testimony whereof I have hereunto set my hand in the presence of two subscribing witnesses.

HERMAN J. BRENNECKE.

Witnesses:
WM. MEYER,
ANTON G. FASTENMAIER.

Copies of this patent may be obtained for five cents each, by addressing the "Commissioner of Patents, Washington, D. C."